(12) United States Patent
Hayashi

(10) Patent No.: US 8,132,071 B2
(45) Date of Patent: Mar. 6, 2012

(54) TRANSMITTING DEVICE, RECEIVING DEVICE, PACKET TRANSMISSION METHOD, PACKET RECEPTION METHOD, AND PROGRAMS FOR SAME

(75) Inventor: Morihiko Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1078 days.

(21) Appl. No.: 12/015,042

(22) Filed: Jan. 16, 2008

(65) Prior Publication Data

US 2008/0184087 A1 Jul. 31, 2008

(30) Foreign Application Priority Data

Jan. 26, 2007 (JP) ................ P2007-016239

(51) Int. Cl.
*H04L 1/18* (2006.01)
(52) U.S. Cl. .................. 714/751; 714/776
(58) Field of Classification Search .......... 370/390, 370/336, 312; 714/18, 751, 776
See application file for complete search history.

(56) References Cited

U.S. PATENT DOCUMENTS

| | | | | |
|---|---|---|---|---|
| 6,782,490 | B2 * | 8/2004 | Maxemchuk et al. | 714/18 |
| 7,577,140 | B2 * | 8/2009 | Curtis | 370/390 |
| 7,590,889 | B1 * | 9/2009 | Maxemchuk et al. | 714/18 |
| 7,620,847 | B1 * | 11/2009 | Maxemchuk et al. | 714/18 |
| 7,813,324 | B1 * | 10/2010 | Goel et al. | 370/336 |
| 2011/0096712 | A1 * | 4/2011 | Kish et al. | 370/312 |

FOREIGN PATENT DOCUMENTS

| | | |
|---|---|---|
| JP | 2001-308784 | 11/2001 |
| JP | 2001-320324 | 11/2001 |
| JP | 2002-033781 | 1/2002 |
| JP | 2003-298560 | 10/2003 |
| JP | 2003-324733 | 11/2003 |
| JP | 2005-244315 | 9/2005 |
| JP | 2005-321515 | 11/2005 |
| JP | 2006-229844 | 8/2006 |
| JP | 2011-112576 | 6/2011 |
| WO | WO 2005/036818 A1 | 4/2005 |
| WO | WO 2006/041960 A1 | 4/2006 |
| WO | WO 2006/074408 A2 | 7/2006 |

OTHER PUBLICATIONS

Notification of Reason for Refusal, counterpart Japanese Patent Application No. 2007-016239, dated Oct. 25, 2011, (7 pgs., including 3 pg. translation).

* cited by examiner

*Primary Examiner* — David Ton
(74) *Attorney, Agent, or Firm* — Finnegan, Henderson, Farabow, Garrett & Dunner, L.L.P.

(57) ABSTRACT

A network interface unit of a server determines whether the transmission method of transmitting a packet is multicast transmission or unicast transmission; adds to the packet a second FEC when the transmission method of the packets is determined to be multicast transmission and adds to the packet an error detection code for ARQ when the transmission method of the packets is determined to be unicast transmission; and transmits the packet to clients. Each client determines whether the transmission method of the received packet is multicast transmission or unicast transmission; corrects the error on the basis of the second FEC when the transmission method is determined to be multicast transmission; and detects the error on the basis of the error detection code and generates a retransmission request signal when the transmission method is determined to be unicast transmission.

13 Claims, 9 Drawing Sheets

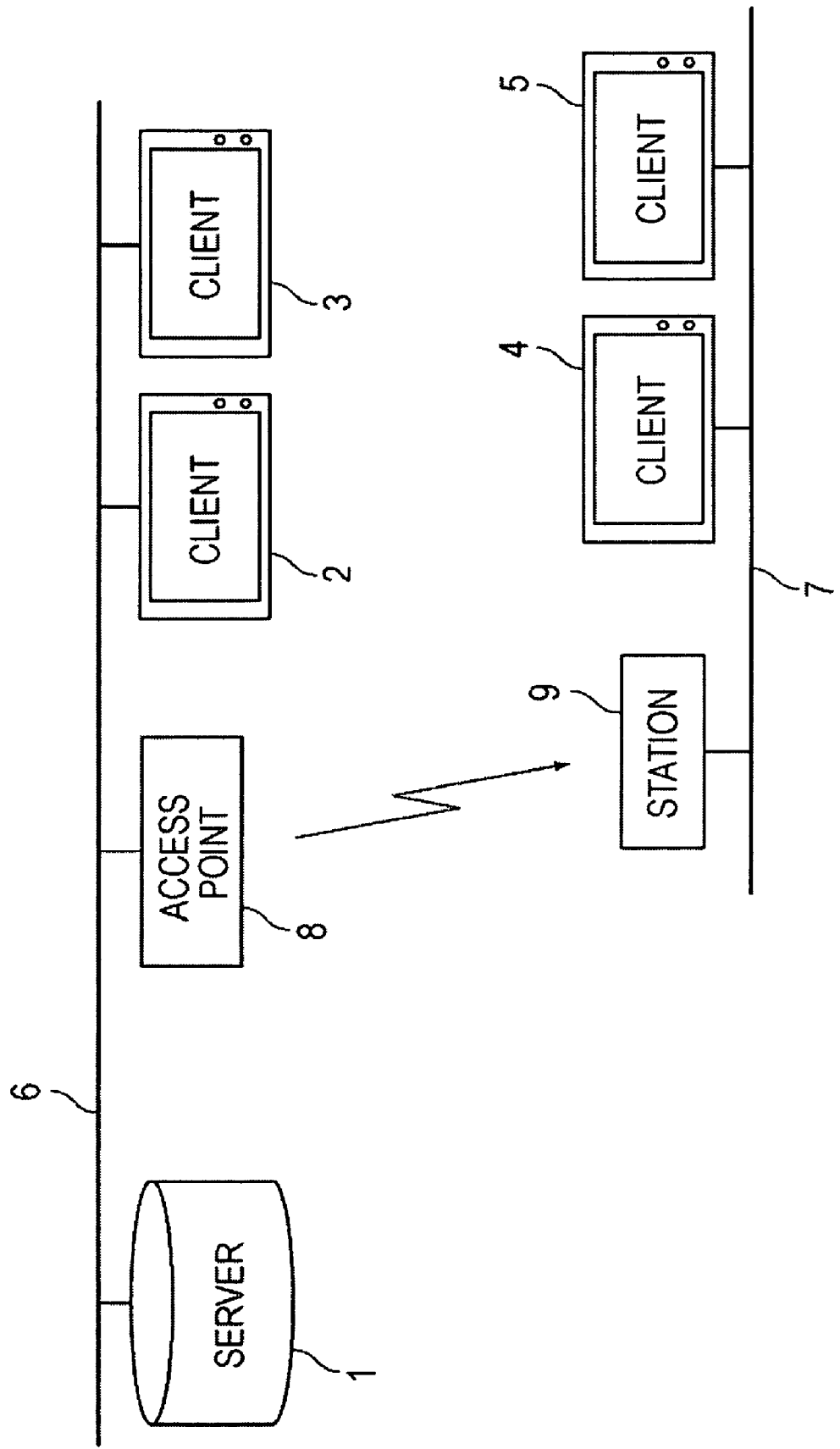

TRANSMITTING DEVICE, RECEIVING DEVICE, PACKET TRANSMISSION METHOD, PACKET RECEPTION METHOD, AND PROGRAMS FOR SAME

CROSS REFERENCES TO RELATED APPLICATIONS

The present invention contains subject matter related to Japanese Patent Application JP 2007-016239 filed in the Japanese Patent Office on Jan. 26, 2007, the entire contents of which are incorporated herein by reference.

BACKGROUND OF THE INVENTION

1. Field of the Invention

The present invention relates to a transmitting device capable of transmitting packets of, for example, video content data via a network, a receiving device capable of receiving the packets, a method of transmitting packets with the transmitting device, a method of receiving packets with the receiving device, and programs for the same.

2. Description of the Related Art

A transmission mode for an Internet Protocol (IP) network according to the related art includes unicast transmission in which a device on the transmission side transmits packets to a device on the reception side by assigning a single destination address and multicast transmission in which packets are transmitted to a plurality of devices on the reception side on the basis of a plurality of grouped destination addresses. Unicast transmission is generally suitable for reliably transmitting relatively small amounts of data, such as files, whereas multicast transmission is suitable for a streaming method in which large amount of data, such as audio and video (AV) contents using, for example, the Internet or a Local Area Network (LAN), are delivered to a plurality of devices on the reception side.

In unicast transmission, transmission control protocol (TCP), which is a higher-level layer IP, is also used to secure reliability, and packets are transmitted after the device on the transmission side adds error detection codes to the packets. When errors occur in the transmitted packets, the errors are detected by the device on the reception side by the error detection codes, the packets are discarded, a process for requesting the device on the transmission side to resend the packets (automatic repeat request (ARQ)) is carried out, and the errors are corrected by the device on the transmission side resending the packets on the basis of this request.

In multicast transmission, a user datagram protocol (UDP), which is a higher-level layer IP, is also used to improve the transmission efficiency. However, since TCP cannot be used, retransmission control by ARQ cannot be carried out. Therefore, in multicast transmission, the device on the transmission side adds error code signals, and when errors occur, the error correction codes are used by the reception side device to detect and correct the errors without resending the packets (this is known as forward error correction (FEC)).

In this way, by using ARQ in unicast transmission, even when errors are included in all sets of data, the errors in the sets of data can be corrected. However, in multicast transmission, if multiple errors occur, the errors cannot be completely corrected even by using an FEC according to the related art.

The error-generation characteristic changes depending on the characteristic of the transmission path. For example, in general, the probability of errors occurring in a line transmission path is extremely low, and the errors occur randomly. In contrast, the probability of errors occurring in a wireless transmission path varies, and there is a high probability of the errors occurring in bursts. However, on the Internet, the path of data transmission cannot be assigned, and thus, errors cannot be predicted. Therefore, in many cases employing multicast transmission, errors cannot be completely corrected using error correction signals added to the packets at the device on the transmission side by the FEC according to the related art.

Consequently, it is desirable to carry out retransmission in multicast transmission so as to reliably correct errors. However, as described above, retransmission cannot be carried out in multicast transmission according to the related art. To carry out retransmission in unicast transmission by employing ARQ, an entire packet is discarded for, for example, an error of merely one bit, causing a significant reduction in the transmission efficiency.

Patent Document 1, mentioned below, describes a communication method as a technology that enables retransmission during multicast transmission. According to this communication method, when multicast transmission that does not include retransmission is being carried out between a wireless station and a wireless terminal, the quality of the wireless transmission is determined at the wireless station or the wireless terminal; when the quality of the wireless transmission becomes low, the wireless terminal is separated from the multicast group and communication between the wireless station and the wireless terminal is switched to unicast transmission including retransmission; when carrying out unicast transmission, the quality of the wireless transmission is determined at the wireless station or the wireless terminal on the basis of the data received by the wireless terminal; when it is determined that the quality of the wireless transmission is good, the wireless terminal is returned to the multicast group; and the communication unit is switched to multicast transmission that does not include retransmission.

[Patent Document 1]

Japanese Unexamined Patent Application Publication No. 2001-308784 (paragraphs [0010] and [0012], FIG. 7)

SUMMARY OF THE INVENTION

According to the technology described in Patent Document 1, the transmission method is switched to unicast transmission after it is determined that the quality of wireless communication in multicast transmission has been reduced. Therefore, retransmission of data including errors cannot be carried out in time, and, in some cases, the errors cannot be corrected. In particular, if one wireless terminal is separated from the multicast group when streaming a large amount of video data by multicast transmission, there is a possibility that the separated wireless terminal cannot be synchronized with the plurality of other wireless terminals included in the multicast group. Furthermore, according to the technology described in Patent Document 1, an error correction code is not added in multicast communication. Therefore, when errors occur in bursts in the transmission paths connecting the wireless terminals in the multicast group, all of the wireless terminals will be separated from the multicast group, causing them to carry out unicast transmission. In this way, a negative cycle of the transmission efficiency being reduced when, in particular, a large amount of video data is delivered and the transmission efficiency further being reduced when retransmission to the wireless terminals is carried out.

To solve the above-described problems, the present invention provides a transmitting device that is capable of carrying out efficient packet transmission while efficiently and reliably correcting errors that occur in packet in accordance with the properties of the transmission paths, the transmission method, and the transmitted data, a receiving device that receives the packets, a packet transmission method for the transmitting device, a packet reception method for the receiving device, and programs thereof.

To solve the above-described problems, the transmitting device according to an embodiment of the present invention transmits a packet to at least one receiving device via a network and includes determining means for determining whether the transmission method of transmitting the packet is multicast transmission or unicast transmission; code-adding means for adding to the packet an error correction code for correcting an error that occurs in the packet during transmission by the receiving device when the transmission method of the packets is determined to be multicast transmission and adding to the packet an error detection code for detecting the error by the receiving device and transmitting a retransmission request signal of the packet to the transmitting device when the transmission method of the packets is determined to be unicast transmission; and transmitting means for transmitting the packet to which the error correction code or the error detection code is added to the receiving device.

Here, the network may be a wired, wireless, or power line network, or may be a network including all of these types. The transmitting device and the receiving device may be, for example, electronic devices, such as personal computers (PCs), television sets, digital video recorders (DVRs), or game machines, or may be network interfaces (network interface cards (NIC)) included in these electronic devices. The transmitting device may be provided as an access point for converting, for example, a wired transmission path connected to an electronic device on the server side into a wireless transmission path or a power line communication (PLC) path, whereas the receiving device may be provided as a station capable of access the access point and connected to an electronic device on the client side. The transmitting device and the receiving device are not devices solely used for transmission and reception, respectively. The transmitting device may include receiving means, and the receiving device may include transmitting means.

The error correction code is a code based on an error correction method, such as FEC, that does not include retransmission. The error detection code is a code based on a correction method, such as ARO, that includes retransmission. In some case, an error correction code for multicast transmission according to the related art may already been added to the packet at the transmitting device. In some other cases, an error correction code according to the related art may have already been added to the packet at the original source of the packet.

According to this structure, it determined whether the transmission method is multicast transmission or unicast transmission. If the transmission method is multicast transmission, an error correction code is added to the packets so that the receiving device can efficiently correct errors without discarding the packets having errors. If the transmission method is unicast transmission, errors can be reliably corrected by the receiving device requesting retransmission of the packets. In other words, according to the embodiments of the present invention, error correction by error correction codes in multicast transmission and error correction by error detection codes in unicast transmission and by retransmission control can both be achieved. Therefore, for example, transferring of relatively small files in unicast transmission and streaming of a large amount of video content in multicast transmission can both be carried out. In this way, errors can be reliably and efficiently corrected at the receiving device and data can be transmitted efficiently in the same network by flexibly responding to the differences in the property of the transmission path, the transmission method, and the transmitted data.

When an error correction code according to the related art is added to a packet by the transmitting device or another device, a new error correction code can be added by code adding means. Therefore, errors that cannot be completely corrected by the error correction code according to the related art can be reliably corrected.

In the transmitting device, the packet may include a header section and a data section including the error correction code, and, when the determining means determines that the transmission method is multicast transmission, the transmitting means may include modulating means for modulating the data section of the packet according to a first modulation method having a first error rate and modulating the header section according to a second modulation method having a second error rate that is lower than the first error rate.

The header section includes basic information, such as packet length, the destination addresses of a plurality of receiving devices, and transmission speed. The data section includes data such as video content. The first modulation method is a modulation method such as binary phase shift keying (BPSK). The second modulation method is a modulation method such as quadrature amplitude modulation (QAM). In this way, by employing a modulation method that has a lower error rate for the header section of the packet than the data section, even if an error occurs in the data section, the basic information in the more important header section is reliably transmitted to the receiving device, and the error can be reliably corrected at the receiving device by the error correction code.

The transmitting device may further include recording means for recording error information indicating whether or not an error has occurred in the packet transmitted from the transmitting means to the receiving device when the determining means determines that the transmission method is unicast transmission, wherein the error correction code may be added such that error correction is carried out at the receiving device at a first cycle, and wherein the modulating means may include comparing means for calculating a second cycle of the occurred errors on the basis of the recorded error information and comparing the first cycle and the second cycle and transmission-speed controlling means for reducing the transmission speed of the packet in the second modulation method when the second cycle is shorter than the first cycle.

Recording of the error information is carried out by, for example, recording whether or not an ACK (response signal) has been received in response to the transmission of the packet. In this way, when the error cycle is longer than the error correction cycle, i.e., when the error frequency is lower than the error correction frequency, even if an error occurs, a transmission speed that allows the receiving device to correct the error can be maintained. When the error cycle is shorter than the error correction cycle, i.e., when the error frequency is higher than the error correction frequency, the error frequency is lowered by lowering the transmission speed to enable reliable error correction at the receiving device. In other words, by using error information of unicast transmission, the transmission speed of multicast transmission can be optimized. The transmission speed is reduced by lowering the number of states of the QAM amplitude and phase by one order such that, for example, 128 QAM is change to 64 QAM so as to lower the transmission efficiency.

In the transmitting device, the transmission-speed controlling means may increase the transmission speed in the second modulation method when an error has not occurred.

In this way, when an error has not occurred, the transmission speed can be increased to further improve the packet transmission efficiency. In such a case, in contrast to the case above, the transmission speed is increased by increasing the number of states of the QAM amplitude and phase by one order such that, for example, 64 QAM is change to 128 QAM.

In the transmitting device, the transmission-speed controlling means may be capable of increasing the transmission speed in the second modulation method to a first speed, and the code-adding means may include controlling means for not adding the error correction code to the packet during multicast transmission when an error has not occurred and when the transmission speed is the first speed.

In this way, when an error has not occurred and the transmission speed is a maximum value, the possibility of an error occurring is significantly low. Therefore, the transmission efficiency of the packet can be further improved by transmitting the packet without adding an error correction code to the packet.

In the transmitting device, the transmitting means may include a test-packet transmitting means for transmitting a test packet to the receiving device by unicast transmission when the determining means determines that the transmission method is multicast transmission so as to record the error information to the recording means before transmitting the packet by multicast transmission.

In this way, even when transmission is not carried out by unicast transmission, error information can be recorded by sending a test packet, and the transmission speed can be optimized on the basis of the error information.

A transmitting device according to another embodiment of the present invention receives a packet from a transmitting device via a network and includes receiving means for receiving, from the transmitting device, the packet to which an error correction code for correcting an error that has occurred in the packet during reception or an error detection code for detecting the error and transmitting a retransmission request signal for the packet to the transmitting device; determining means for determining whether the transmission method of the transmitting device that transmitted the received packet is multicast transmission or unicast transmission; error-correcting means for correcting the error on the basis of the error correction code when the transmission method is determined to be multicast transmission and when the error has occurred; and error-detecting means for detecting the error on the basis of the error detection code and generating the retransmission request signal when the transmission method is determined to be unicast transmission and when the error has occurred.

According to this structure, since the transmission method of the packet from the transmitting device is determined to be either multicast transmission or unicast transmission, when an error occurs in the received packet, error correction by the error correction code, error detection by the error detection code and transmission of a retransmission request can all be carried out. Therefore, in this way, errors can be reliably and efficiently corrected at the receiving device and data can be transmitted efficiently in the same network by flexibly responding to the differences in the property of the transmission path, the transmission method, and the transmitted data.

A packet transmission method according to another embodiment of the present invention is a method of transmitting a packet from a transmitting device to at least one receiving device via a network, the method comprising the steps of determining whether the transmission method of transmitting the packet is multicast transmission or unicast transmission; adding to the packet an error correction code for correcting an error that occurs in the packet during transmission by the receiving device when the transmission method of the packets is determined to be multicast transmission and adding to the packet an error detection code for detecting the error by the receiving device and transmitting a retransmission request signal of the packet to the transmitting device when the transmission method of the packets is determined to be unicast transmission; and transmitting the packet to which the error correction code or the error detection code is added to the receiving device.

A packet reception method according to another embodiment of the present invention is a method of receiving a packet at a receiving device from a transmitting device via a network, the packet reception method comprising the steps of receiving, from the transmitting device, the packet to which an error correction code for correcting an error that has occurred in the packet during reception or an error detection code for detecting the error and transmitting a retransmission request signal for the packet to the transmitting device; determining whether the transmission method of the transmitting device that transmitted the received packet is multicast transmission or unicast transmission; correcting the error on the basis of the error correction code when the transmission method is determined to be multicast transmission and when the error has occurred; and detecting the error on the basis of the error detection code and generating the retransmission request signal when the transmission method is determined to be unicast transmission and when the error has occurred.

A program according to another embodiment of the present invention executed by a transmitting device that transmits a packet to at least one receiving device via a network includes the steps of determining whether the transmission method of transmitting the packet is multicast transmission or unicast transmission; adding to the packet an error correction code for correcting an error that occurs in the packet during transmission by the receiving device when the transmission method of the packets is determined to be multicast transmission and adding to the packet an error detection code for detecting the error by the receiving device and transmitting a retransmission request signal of the packet to the transmitting device when the transmission method of the packets is determined to be unicast transmission; and transmitting the packet to which the error correction code or the error detection code is added to the receiving device.

A program according to another embodiment of the present invention executed by a receiving device that receives a packet from a transmitting device via a network includes the steps of receiving, from the transmitting device, the packet to which an error correction code for correcting an error that has occurred in the packet during reception or an error detection code for detecting the error and transmitting a retransmission request signal for the packet to the transmitting device; determining whether the transmission method of the transmitting device that transmitted the received packet is multicast transmission or unicast transmission; correcting the error on the basis of the error correction code when the transmission method is determined to be multicast transmission and when the error has occurred; and detecting the error on the basis of the error detection code and generating the retransmission request signal when the transmission method is determined to be unicast transmission and when the error has occurred.

As described above, according to the embodiments of the present invention, packet transmission can be carried out efficiently while efficiently and reliably correcting errors that occur in packet in accordance with the properties of the transmission paths, the transmission method, and the transmitted data.

BRIEF DESCRIPTION OF THE DRAWINGS

FIG. 9 illustrates the structure of a packet transmission and reception system according to another embodiment of the present invention.

DESCRIPTION OF THE PREFERRED EMBODIMENTS

Embodiments of the present invention will be described below with reference to the drawings.

Figure 1:
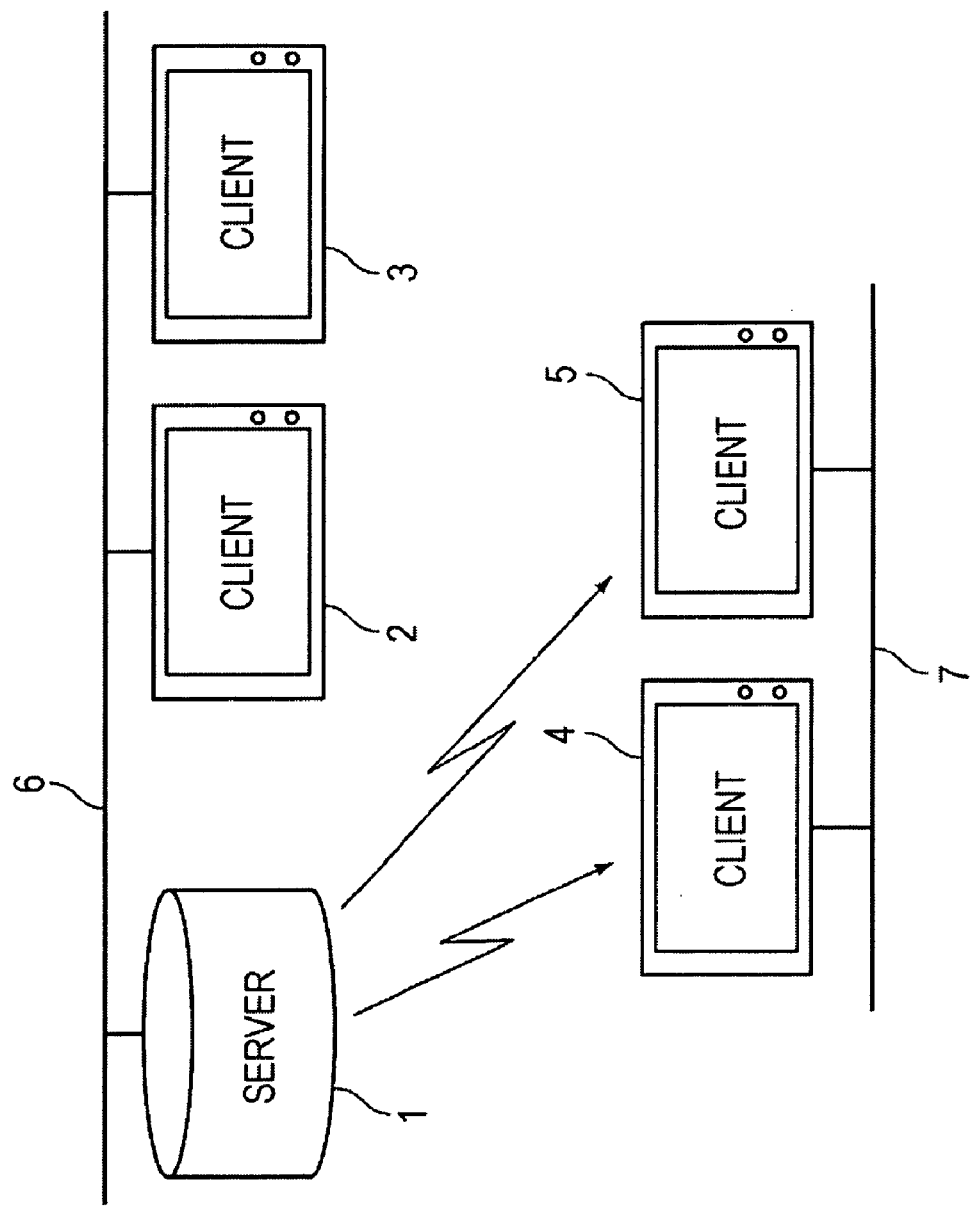
FIG. 1 illustrates the structure of a packet transmission and reception system including a transmitting device and a receiving device according to an embodiment of the present invention.

FIG. 1 illustrates the structure of a packet transmission and reception system including a transmitting device and a receiving device according to an embodiment of the present invention.

As shown in the drawing, the packet transmission and reception system constitutes, for example, an in-home LAN by connecting, for example, one server 1 and four clients 2 to 5 via a network. The server 1 and the clients 2 and 3 are connected to a line transmission path 6, such as an Ethernet (Trademark). The clients 4 and 5 are connected to a line transmission path 7 and are capable of wireless communication with the server 1 via wireless LAN. The server 1 and the clients 2 to 5 are, in particular, electronic devices, such as personal computers (PC) and television sets.

This embodiment is described on the assumption that the server 1 is a transmitting device, the clients 2 to 5 are receiving devices, wherein the server 1 carries out streaming of video content in response to a request from any of the clients 2 to 5 or other types of data files are transmitted and received between the server 1 and the clients 2 to 5. The number of servers and clients included in the network is not limited to one and four, respectively, and a plurality of servers and a plurality of clients may be connected via wired, wireless, and/or power line networks.

Figure 2:
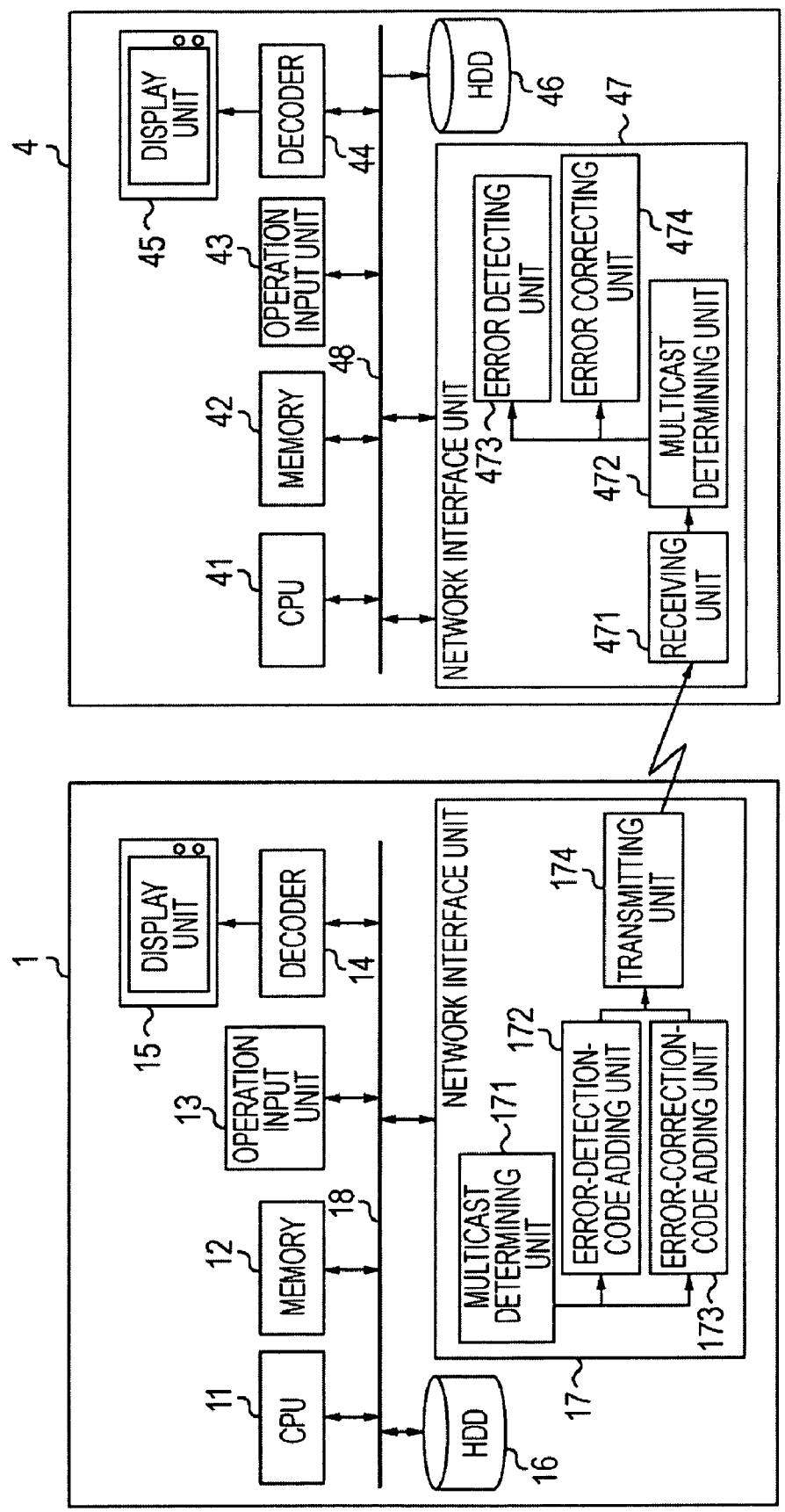
FIG. 2 illustrates the structures of the server and the clients shown in FIG. 1.

FIG. 2 illustrates the structures of the server 1 and the client 4.

As shown in the drawing, the server 1 includes a CPU 11, a memory 12, an operation input unit 13, a decoder 14, a display unit 15, a hard disk drive (HDD) 16, and a network interface unit 17, which are mutually connected via an inner bus 18.

The CPU 11 access the memory 12 and the other units when required and carries out overall control of each block in the server 1, while carrying out various calculations. The memory 12 is used as a work area for the CPU 11 and temporarily holds processing data, such as an OS, other programs, and video contents to be sent to the clients 2 to 5.

The operation input unit 13 includes buttons, switches, keys, indicators for checking operation, and a light-sensing unit for detecting infrared signals from a remote controller (not shown). The operation input unit 13 outputs various instructions input by the user to the CPU 11. The HDD 16 stores video content, various programs, and other data on an embedded hard disk and reads out these from the hard disk for playback. The decoder 14 decodes the video content read out from the HDD 16 and outputs the decoded video content to the display unit 15.

In this embodiment, the video content stored in the HDD 16 is prepared by MPEG (Moving Picture Experts Group) format, such as, MXF (Material exchange Format), established by the Pro-MPEG Forum and so on. Error correction codes based on FEC are added to the video content by the server 1 or another device, which is where the video content was created, using an algorithm, such as Pro-MPEG COP #3 (Code of Practice Release 3). During multicast transmission, when errors occur in packets included in the video content, devices on the reception side (clients 2 to 5) are capable of correcting the errors using the error correction codes, without requiring retransmission of the packets. In this embodiment, such error correction codes are referred to as "first FECs".

The network interface unit 17 is configured as, for example, an NIC, and includes a multicast determining unit 171, an error-detection-code adding unit 172, an error-correction-code adding unit 173, and a transmitting unit 174. The network interface unit 17 is a wireless communication interface for the clients 4 and 5. Although not shown in the drawings, the server 1 also includes a network interface unit for wired transmission for the clients 2 and 3 and its structure is the same as that of the network interface unit 17, except that the transmitting unit used via, for example, an Ethernet (Trademark).

The multicast determining unit 171 determines whether the packets are to be sent to the clients 4 and 5 by multicast transmission or unicast transmission.

When the multicast determining unit 171 determines that the packets are to be sent by unicast transmission by the multicast determining unit 171, the error-detection-code adding unit 172 adds, for example, error detection codes, which allow error detection based on ARQ and retransmission, to the packets.

When the multicast determining unit 171 determines that the packets are to be sent by multicast transmission by the multicast determining unit 171, the error-correction-code adding unit 173 adds error correction codes, which allow error detection based on the FECs, to the packets.

The error correction codes are added by using an algorithm, such as the Reed-Solomon code. Unlike the first FECs, the error correction codes are not specific to the video content and are effective in error correction of all types of data transmitted via transmission paths between the server 1 and the clients 4 and 5. In this embodiment, the error correction codes added by the network interface unit 17 are referred to as "second FECs", to distinguish them from the first FECs. The second FECs are set such that error correction is carried out at the clients 4 and 5 at a predetermined cycle.

The transmitting unit 174 modulates the packets to which the error detection codes or the second FECs are added and wirelessly transmits them to the clients 4 and 5. This modulation process will be described in detail below.

The basic structure of the client 4 is the same as that of the server 1, except that the structure of a network interface unit 47 differs from that of the network interface unit 17. Therefore, descriptions of a CPU 41, a memory 42, an operation input unit 43, a decoder 44, a display unit 45, and a HDD 46 are omitted, and only the network interface unit 47 will be described.

The network interface unit 47 includes a receiving unit 471, a multicast determining unit 472, an error detecting unit 473, and an error correcting unit 474.

The receiving unit 471 wirelessly receives packets from the transmitting unit 174 of the server 1 and demodulates the received packets. The multicast determining unit 472 determines whether the packets demodulated at the receiving unit 471 were transmitted by unicast transmission or multicast transmission.

When the multicast determining unit 472 determines that the packets have been sent by unicast transmission, the error detecting unit 473 determines whether or not the packets have any errors using the error detection codes added to the packets at the server 1. When an error is detected in a packet, that packet is discarded, and a retransmission request signal for requesting the packet to be retransmitted is sent to the server 1.

When the multicast determining unit 472 determines that the packets have been sent by multicast transmission, the error correcting unit 474 corrects the errors in the packets at a predetermined cycle by the second FECs added to the packets at the server 1. After error correction, the data of the packets is stored in the HDD 46. When the data is video content, the data is decoded at the decoder 44 and is displayed on the display unit 45.

When the received packets are video content, such as MXF, error correction based on the first FECs added to the video content in addition to the second FECs is carried out at the decoder 14.

The structure of the client 5 is the same as that of the client 4. Also, the structure of the clients 2 and 3 are the same, except that the network interface units are for wired communication.

Although not shown in the drawings, the network interface unit 17 of the server 1 includes a receiving unit in addition to the transmitting unit 174. Similarly, the network interface unit 47 of the client 4 includes a transmitting unit in addition to the receiving unit 471.

Figure 3:
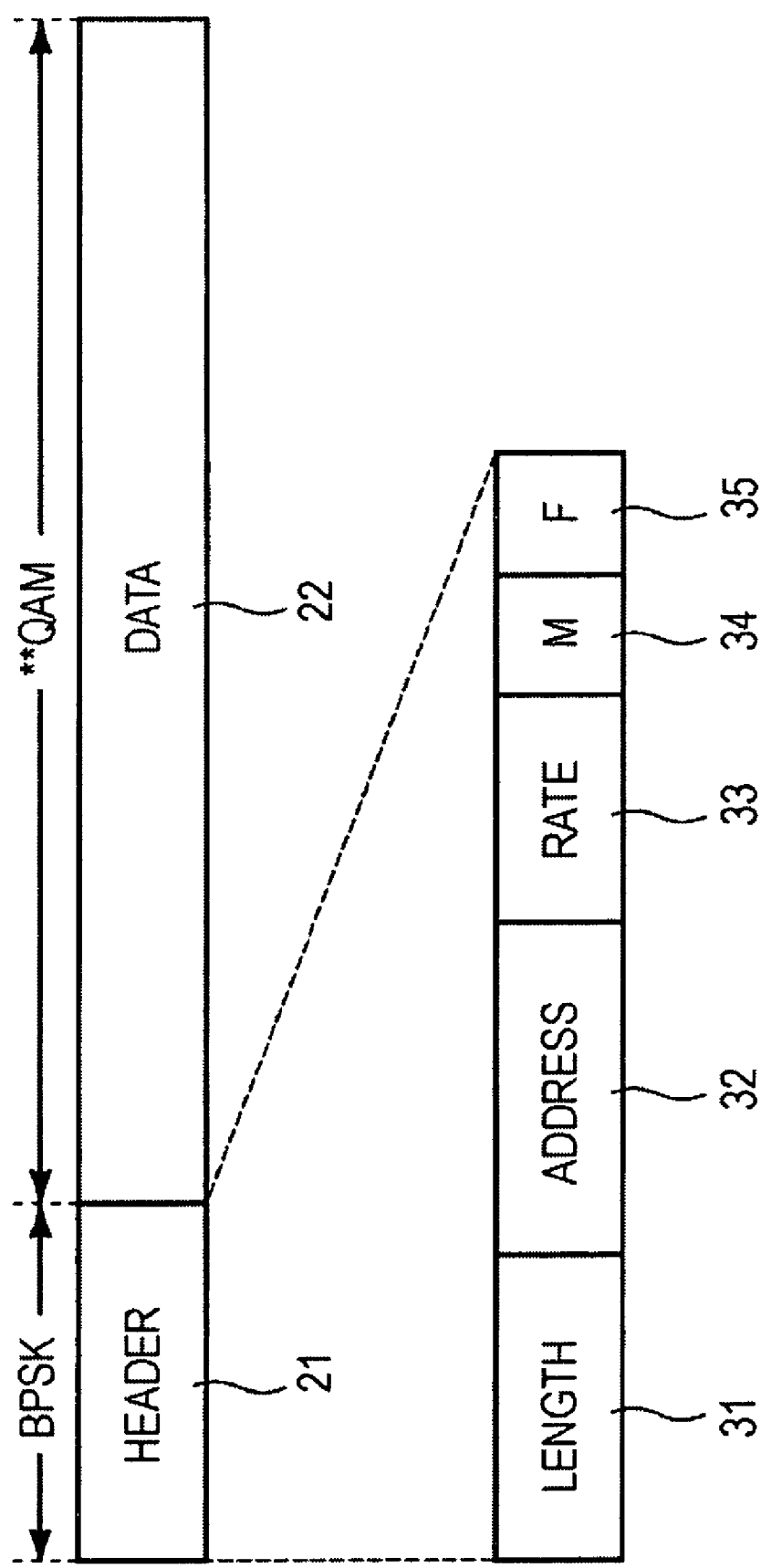
FIG. 3 illustrates the data structure of a transmitted packet according to an embodiment of the present invention.

Next, the data structure of the packets sent from the server 1 of this embodiment will be described. FIG. 3 illustrates the data structure of a packet sent from the transmitting unit 174 of the network interface unit 17 to the clients 4 and 5.

As shown in the drawing, a wirelessly transmitted packet includes a header 21 and data 22. The header 21 includes information about length 31 (packet length), address 32 (destination IP address), rate 33 (wireless transmission speed and modulation method information), control information M 34, and control information F 35.

The control information M 34 is a flag indicating whether the packet is transmitted by multicast transmission or unicast transmission. The control information F 35 is a flag indicating whether or not a second FEC is added. A second FEC is added to the data 22.

The transmitting unit 174 of the network interface unit 17 modulates the header 21, which is directly affected by an error during transmission of the packet, by always using binary phase shift keying (BPSK) that has a low error rate. In contrast, the data 22 is modulated by quadrature amplitude modulation (QAM) that has high transmission efficiency, although the error rate is higher than BPSK. According to QAM, the data is changed, for example, from 16 QAM to 256 QAM, depending on the transmission environment. Accordingly, the rate 33 is also changed. In this way, even when an error occurs in the data 22, important information, such as the packet length and the destination address, is reliably transmitted. Therefore, the data 22 can be reliably corrected by the second FEC at the clients. Details of changing the QAM (transmission speed) will be described below.

The basic structure of a packet transmitted to the clients 2 and 3 by wired transmission is that same as that of the packet transmitted wirelessly. However, for example, information corresponding to the rate 33 is information about the transmission speed of wired transmission or information about the modulation method.

In this embodiment, the network interface unit 17 of the server 1 records information about errors that occur in the transmission paths between the clients 2 to 5 and determines the transmission speed, the modulation method, and the method of adding the second FECs in accordance with the error frequency (error frequency). This determination process will be described below.

Figure 4:
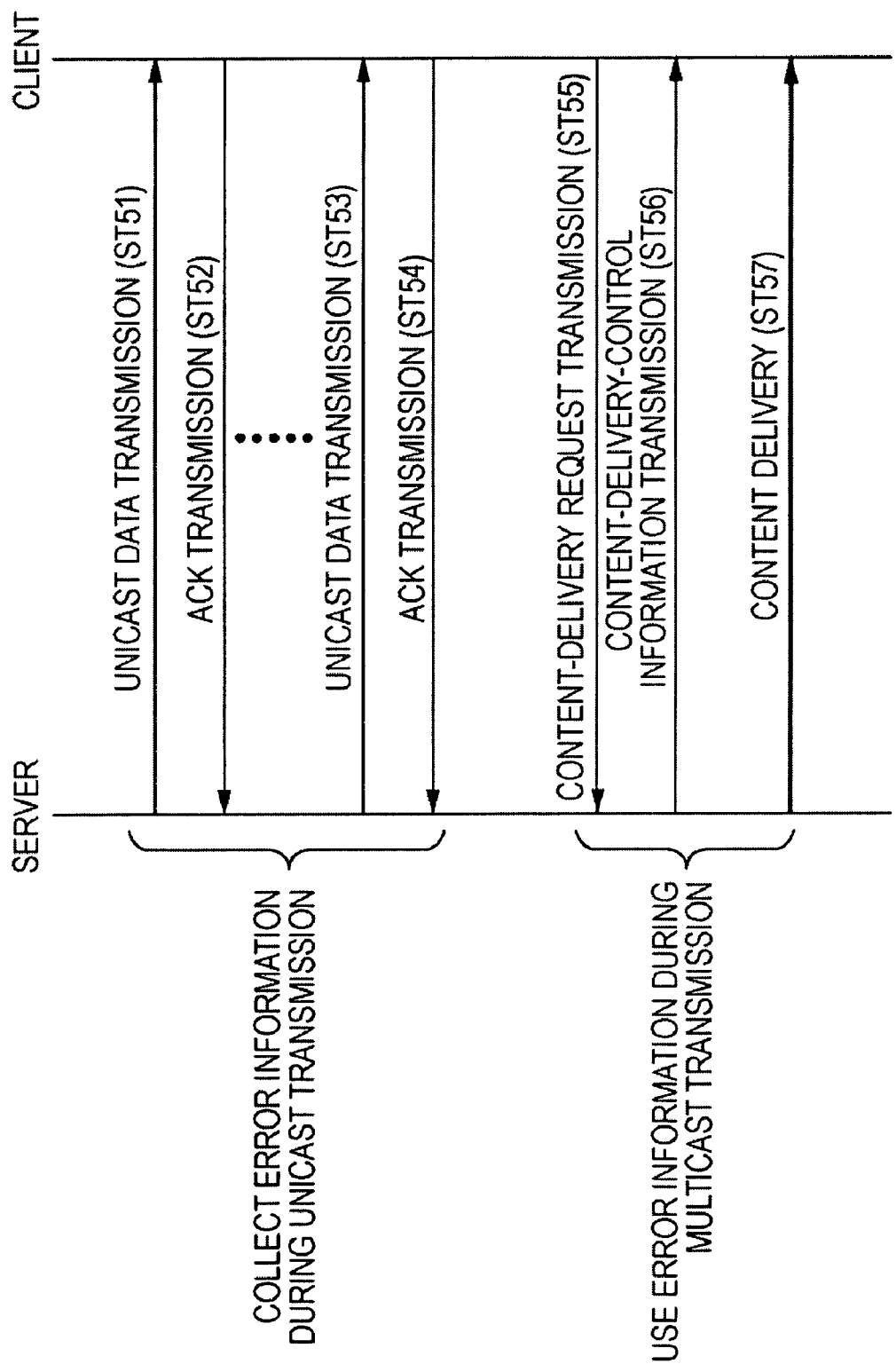
FIG. 4 is a sequence diagram of illustrating the data flow between the server and the clients during unicast transmission according to an embodiment of the present invention.

The error information is recorded during unicast transmission between the server 1 and the clients 2 to 5. FIG. 4 is a sequence diagram illustrating the data flow between the server 1 and the clients 2 to 5 during unicast transmission.

As shown in the drawing, unicast data, such as a transfer file, which is not part of the video content, is transmitted by assigning only the clients 4 from the server 1 (Step 51). When the clients 4 correctly receives the unicast data, the clients 4 sends an ACK (response signal) (Step 52). When errors occur in the transmitted unicast data and the unicast data is not correctly received by the clients 4, an ACK is not sent to the server 1. Each time unicast data is transmitted, the server 1 determines whether or not an error has occurred on the basis of the ACK sent as a respond and records the result (Steps 53 and 54).

Figure 5:
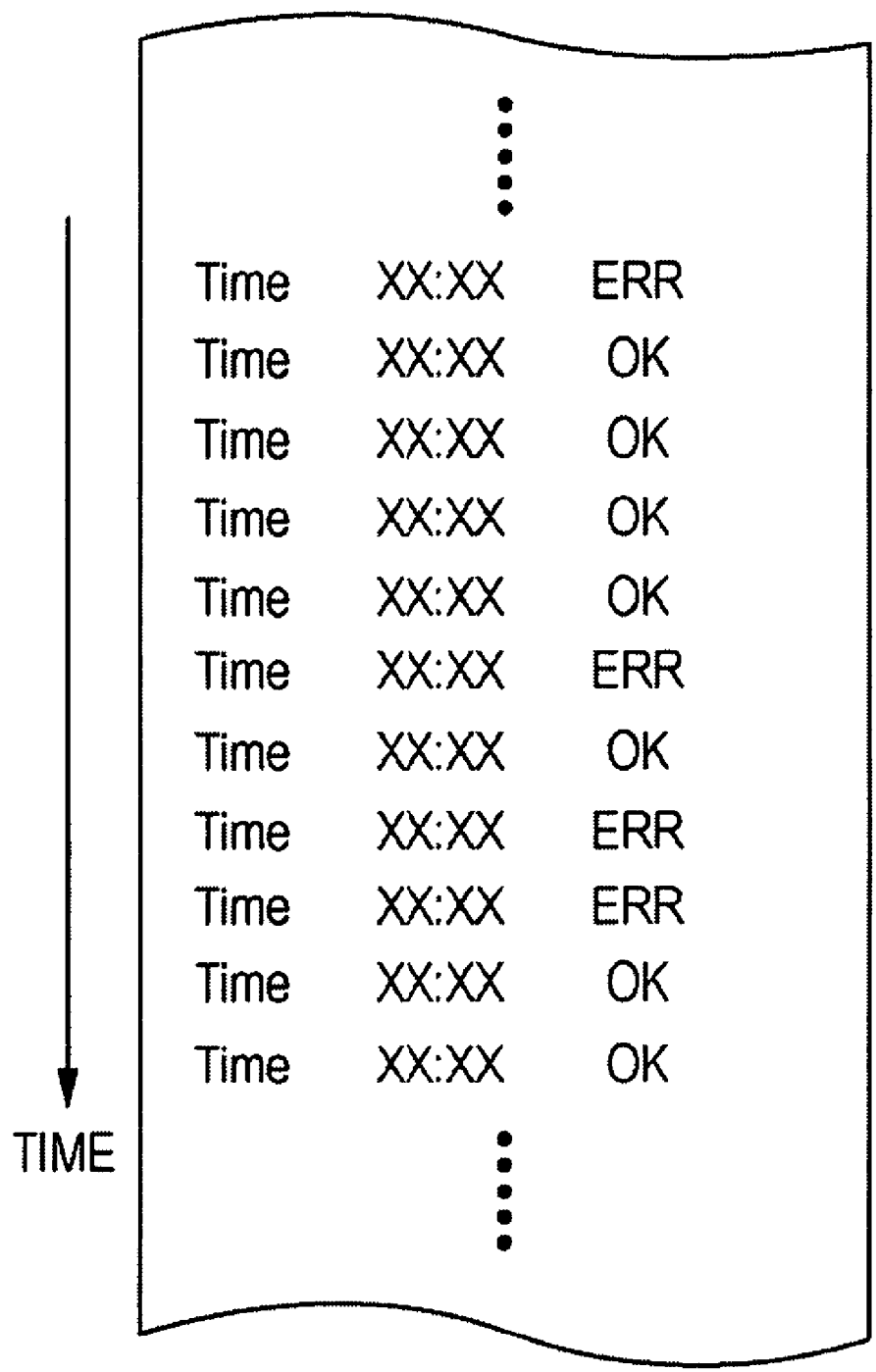
FIG. 5 illustrates the recording of error information according to an embodiment of the present invention.

FIG. 5 illustrates the recording of the error information. As shown in the drawing, every time unicast data is transmitted, the server 1 records, in time sequence, the transmission time and error information indicating whether or not an error occurred (OK/ERR). The recording area of the error information may be in the memory 12 or the HDD 16 or may be a memory (not shown) further included in the network interface unit 17. Instead of constantly recording error information during unicast transmission, the period of recording error information may be set to, for example, a predetermined amount of time that has elapsed since the power of the server 1 has been turned on or a predetermined amount of time since the first packet has been transmitted and received between the clients by unicast transmission.

By referring back to FIG. 4, when a request for streaming of video content is sent to the server 1 from a plurality clients including the client 4 (Step 55), the server 1 transmits content-delivery control information, such multicast IP addresses and MAC addresses of the clients corresponding to the multicast IP addresses, that is required for receiving the video content (Step 56). Up to this point, unicast transmission is carried out between the server 1 and the clients. However, content data transmitted subsequently is transmitted by multicast transmission such that the content data can be simultaneously received by the clients (Step 57).

Figure 6:
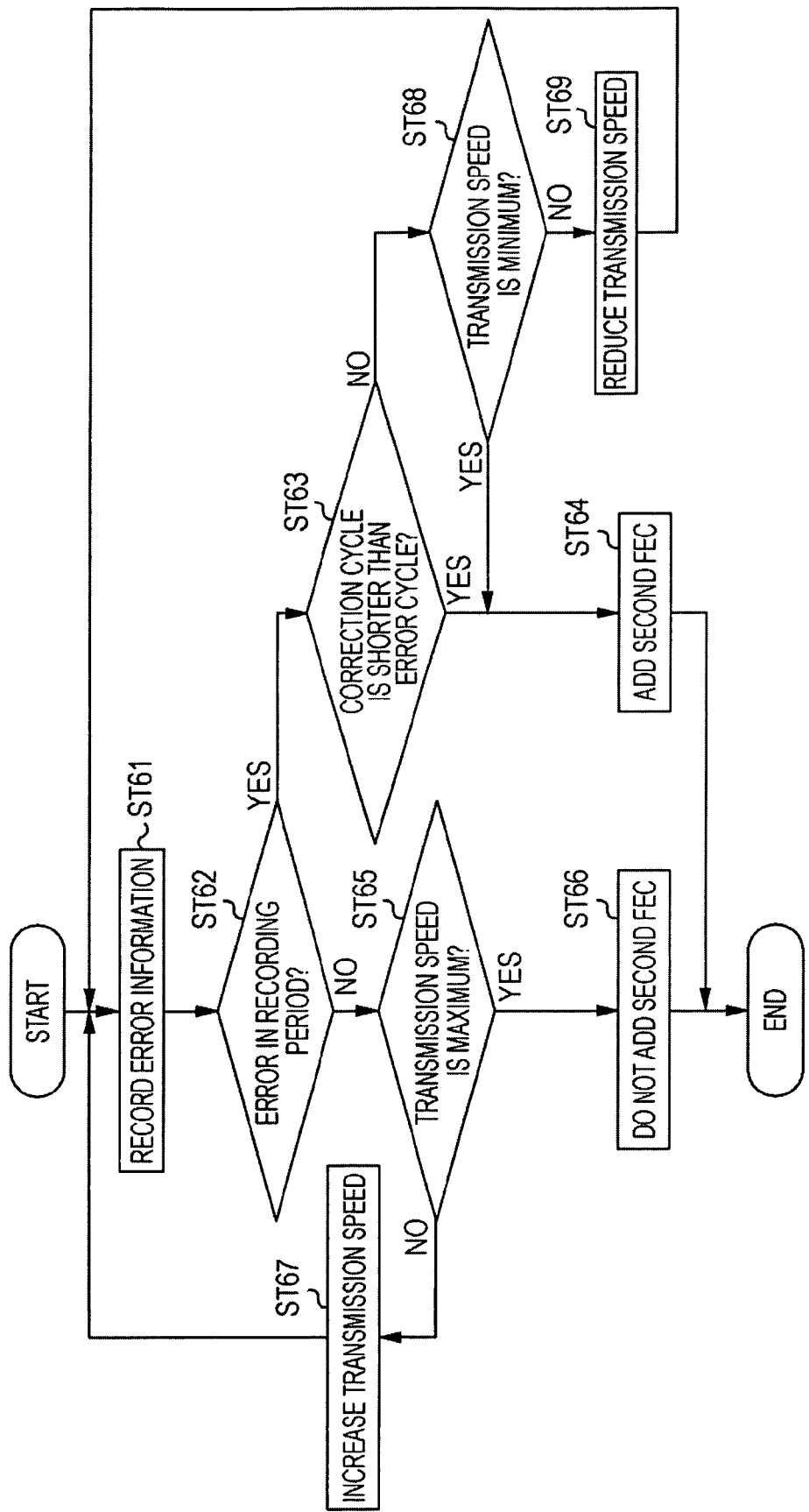
FIG. 6 is a flow chart illustrating the process of determining the transmission method of a packet by using the error information recorded by the server according to an embodiment of the present invention.

Before this multicast transmission, the server 1 uses the error information recorded during unicast transmission according to Steps 51 to 54 to determine the transmission method. FIG. 6 is a flow chart illustrating the process of determining the transmission method.

As shown in the drawing, first, the network interface unit 17 of the server 1 records error information during unicast transmission by employing the above-described method (Step 61). Then, when the multicast determining unit 171 determines that packets that should be transmitted by multicast transmission exist in the clients 4 and 5, it is determined, on the basis of the recorded error information, whether or not errors have occurred during the recording period (Step 62).

When it is determined that errors had occurred, the network interface unit 17 compares the error cycle with the error correction cycle set by the second FECs, which are to be added during multicast transmission (Step 63).

According to this comparison, when it is determined that the error cycle is shorter than the error correction cycle (YES) or, in other words, when the error frequency is lower than the error correction frequency, even when an error occurs, its frequency is within a range that enables error correction by the second FECs. Therefore, the transmission speed and the modulation method is not changed, and it is determined to add the second FECs to the packets to be sent by multicast transmission (Step 64).

When it is determined, on the basis of the comparison, that the error correction cycle is longer than the error cycle (NO) or, in other words, when the error frequency is higher than the error correction frequency, there is a possibility that the errors cannot be completely corrected by the second FECs at the current setting. Therefore, the modulation method is changed, and the wireless transmission speed is reduced (Step 69). The transmission speed is reduced by lowering the number of states of the QAM amplitude and phase by one order such that, for example, the modulation method of the data 22 of a packet is changed from 128 QAM to 64 QAM.

In Step 62, when it is determined that an error has not occurred during the recording period of the packet information (NO), the network interface unit 17 determines whether or not the current transmission speed is a maximum value (Step 65). In this embodiment, as described above, since the modulation method of the data 22 can be changed between 16 QAM to 256 QAM, whether or not the transmission speed is a maximum value is determined on the basis of whether the current modulation method of the data 22 is 256 QAM.

When it is determined that the transmission speed is not a maximum value (NO), the network interface unit 17 increases the wireless transmission speed by increasing the number of state of the QAM amplitude and phase by one order such that the modulation method of the data 22 is changed from 128 QAM to 256 QAM (Step 67).

When it is determined that the transmission speed is a maximum value (YES), the possibility of errors occurring in the transmission path is significantly low, and even if some errors occur, these errors can be corrected by merely the first FECs. Therefore, in such a case, the network interface unit 17 determines that second FECs are not to be added to the packets to be sent by multicast transmission (Step 66).

The network interface unit 17 repeats the above-described operation every time a packet that is to be sent by multicast transmission is detected. By the above-described operation, the best transmission method can be determined by changing the transmission speed and adding or not adding second FECs depending on the error frequency.

During unicast transmission, the network interface unit 17 sends packets always after adding the error detection codes to the data 22, enabling error correction by retransmission.

Although not shown in the drawings, similar to the network interface unit 17 for wireless communication, the network interface unit for wired communication of the server 1 records error information during wired unicast transmission with the clients 2 and 3 and determines the transmission speed and the addition of second FECs depending on the error frequency.

Figure 7:
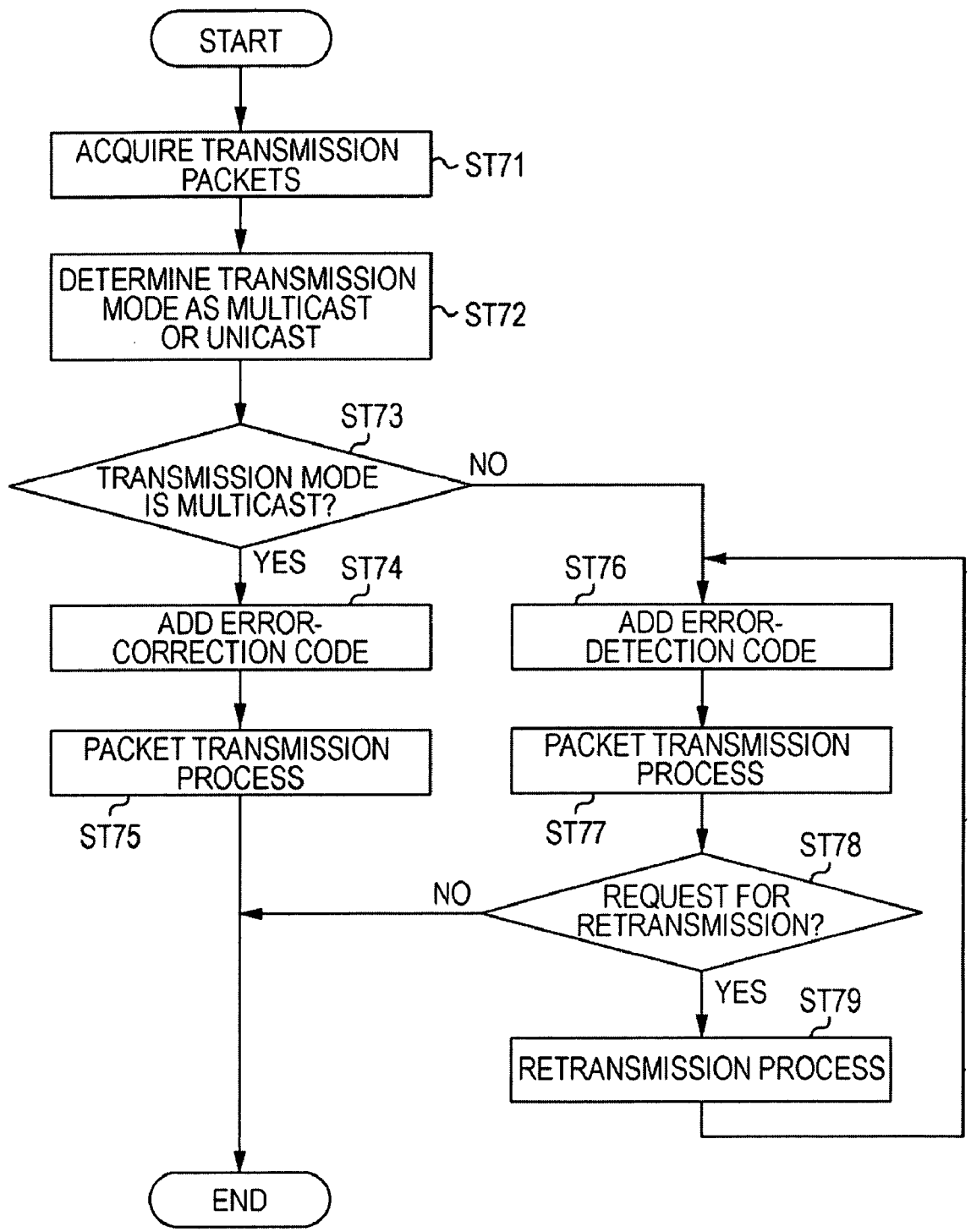
FIG. 7 is a flow chart illustrating the flow of the operation of the server according to an embodiment of the present invention transmitting a packet.

Next, the operation carried out by the server 1 when packets whose transmission method are determined as described above are transmitted will be described. FIG. 7 is a flow chart illustrating the flow of the operation.

As shown in the drawing, first, the network interface unit 17 obtains transmitted packets generated at the CPU 11 on the basis of a content-delivery request from the clients (Step 71). Then, the multicast determining unit 171 determines whether the packets are to be sent by multicast transmission or unicast transmission (Step 72).

When it is determined that a transmitted packet is to be sent by multicast transmission (YES in Step 73), the network interface unit 17 adds a second FEC to the data 22 of the packet as an error correction code at the error-correction-code adding unit 173 (Step 74). At this time, the rate 33 (transmission speed and modulation method information) determined by the method shown in FIG. 6, control information M 34 indicating that the packet is sent by multicast transmission, and control information F 35 indicating that a second FEC has been added are added to the header 21 of the packet. As described above, when an error does not occur while the transmitted packet was generated and when the transmission speed is a maximum value, a second FEC is not added. In this way, unnecessary processing is not carried out, and the load applied to the network interface unit 17 can be suppressed.

The transmitting unit 174 modulates the header 21 of the packet to which a second FEC is added, as described above, according to BPSK, modulates the data 22 according to QAM, whose order is determined by the method shown in FIG. 6, and transmits the packet to the clients 4 and 5, which belong to the multicast group (Step 75).

When it is determined that a transmitted packet is to be sent by unicast transmission (NO in Step 73), the network interface unit 17 adds an error detection code based on ARQ to the data 22 of the packet at the error-detection-code adding unit 172 (Step 76). At this time, control information M 34 indicating that the packet is to be sent by unicast transmission and control information F 35 indicating that a second FEC is not added are added to the header 21 of the packet.

Subsequently, the transmitting unit 174 modulates the packet to which the error detection code has been added and sends the modulated packet to the client 4 or 5 (Step 77). Then, if an error occurs while transmitting the packet and a retransmission request signal for the packet is received from one of the clients (Step 78), the network interface unit 17 retransmits the packet by the transmitting unit 174 to the unit requesting the retransmission (Step 79).

The network interface unit 17 repeats the above-described operation every time a packet to be transmitted is generated. The same operation is carried out at the network interface unit for wired transmission. When the packet is to be sent by multicast transmission, a packet to which a second FEC is added is sent to the clients 2 and 3, whereas, when the packet is to be sent by unicast transmission, a packet to which an error detection code is added is sent to one of the clients 2 and 3.

Figure 8:
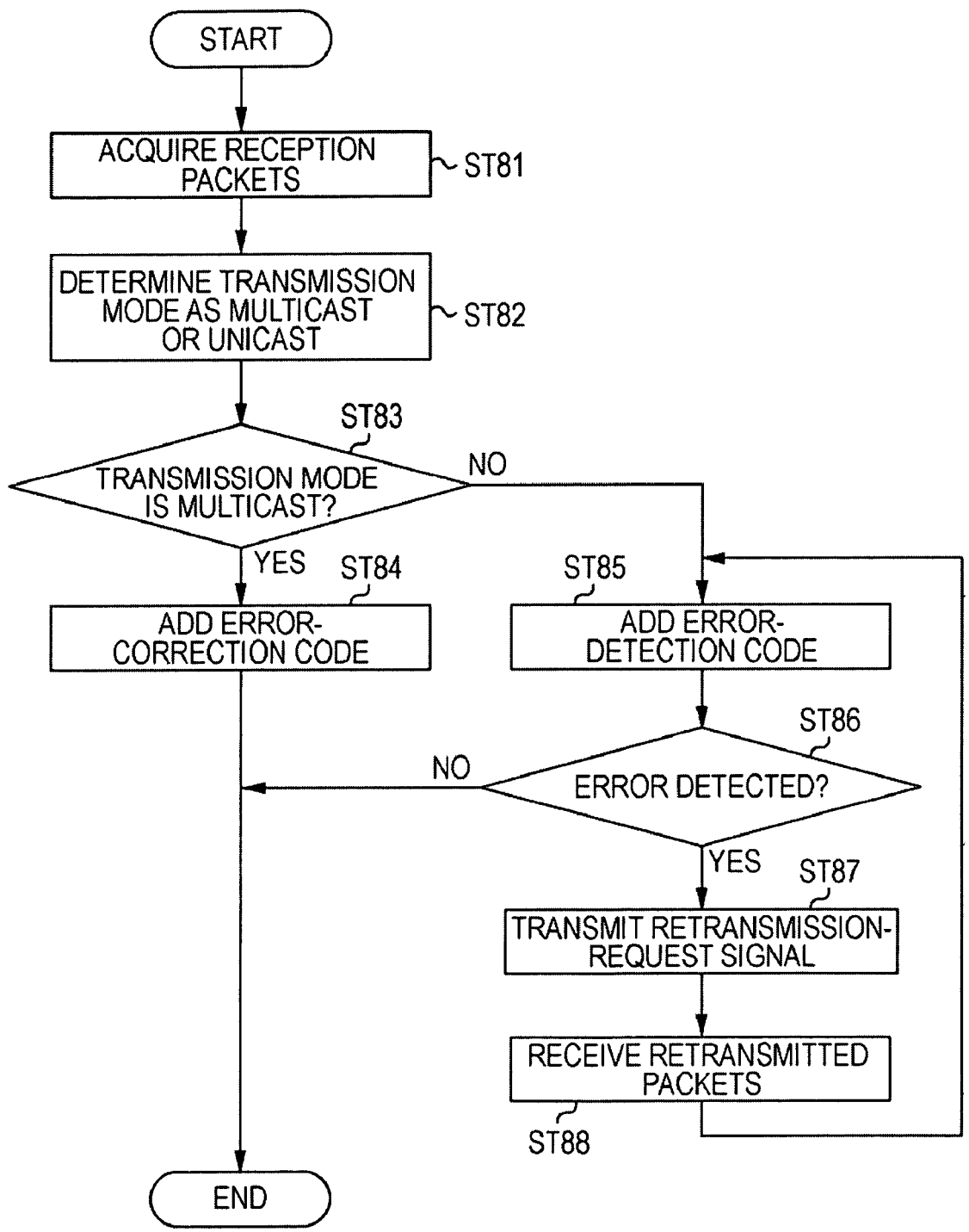
FIG. 8 is a flow chart illustrating the flow of the operation of a client according to an embodiment of the present invention receiving a packet.

Next, the operation carried out when each client receives a packet transmitted from the server 1 as described above. FIG. 8 is a flow chart illustrating the flow of the operation. In the drawing, an example operation of the client 4 is illustrated. However, the operation of the client 5 and the operation of clients 2 and 3 on the line transmission path 6 are the same.

As shown in the drawing, when the receiving unit 471 receives a packet from the server 1 (Step 81), the network interface unit 47 of the client 4 determines whether the received packet is transmitted by multicast transmission or unicast transmission (Step 82). This determination is carried out by referring to the control information M 34 added to the header 21 of the packet.

When it is determined that the received packet has been sent by multicast transmission (YES in Step 83), the network interface unit 47 carries out error correction at the error correcting unit 474 using the second FEC (Step 84). When the received packet is a packet for video content, as described above, the error correction by the first EEC is carried out at the decoder 44.

When it is determined that the received packet has been sent by unicast transmission (NO in Step 83), the network interface unit 47 carries out error detection at the error detecting unit 473 on the basis of ARQ (Step 85). When an error is detected (YES in Step 86), a retransmission request signal for the packet is generated and sent to the server 1 (Step 87). The packet retransmitted from the server 1 is received by the receiving unit 471 (Step 88).

In the above-described operation of the server 1 and the client 4, error correction by an error correction code in multicast transmission and error correction by an error detection code and retransmission in unicast transmission can both be carried out. Therefore, error connection can be reliably and efficiently carried out at the client 4 by responding flexibly to different transmission methods used in the same network. In this way, packets can be transmitted efficiently. For example, transferring of a file having a relatively small size in unicast transmission and streaming of video content of a large size can be carried out efficiently.

Even when a first FEC has already been added to the packet for video content by the transmitting device or another device, an error than cannot be completely corrected by the first EEC can be reliably corrected by further adding a second FEC by the error-correction-code adding unit 173, as described above.

However, the present invention is not limited to the above-described embodiment, and various modifications may be made within the scope of the present invention.

In the above-described embodiment, the network interface unit 17 of the server 1 determines the transmission method by recording error information during unicast transmission. However, multicast transmission may be carried out immediately after the power of the server 1 is turned on. In such a case, error information cannot be recorded. Therefore, before multicast transmission is carried out, the network interface unit 17 may send a test packet to one of the clients by unicast transmission and record error information.

Recording of the error information and determining the transmission method on the basis of the recorded error information may be carried out at a client, instead of the server 1. In such a case, information associated with the determined transmission method is sent to the server 1, and the server 1 sends packets according to the determined transmission.

In the above-described embodiment, the transmission speed and the addition of second FECs are determined on the basis of the error frequency calculated from the recorded error information. However, to maximize the transmission ability, further optimization may be carried out. For example, the network interface unit 17 may determine an optimal transmission speed and whether or not to add second FECs by precisely carrying out calculations, for example, for determining the transmission efficiency by calculating the amount of overhead applied to the network interface unit 17 and the CPU 11 due to adding second FECs to packets, for determining whichever has higher transmission efficiency when packets are sent at a high transmission speed without adding second FECs or at a low transmission speed after adding second FECs, and for determining whichever has higher transmission efficiency when the clients send back ACKs during unicast transmission or do not send back ACKs.

In the above-described embodiment, the second FECs are added to packets to be sent to the clients 2 and 3 connected to the server 1 via the line transmission path 6 and the clients 4 and 5 wirelessly connected to the server 1. However, since less errors occur in the line transmission path 6, second FECs may not be added to packets to be sent to the clients connected to the line transmission path 6. In this way, the load applied to the network interface unit 17 can be suppressed.

In a packet transmission and reception system of the above-described embodiment, packets are directly transmitted and received between the server 1 and the clients. However, the configuration of the system is not limited thereto. Other system configurations according to the present invention will be described below.

FIG. 9 illustrates the configuration of a packet transmission and reception system according to another embodiment of the present invention. In the drawing, same reference numerals are used to represent the members that are the same as those shown in FIG. 1, and descriptions thereof are not repeated. As shown in the drawing, an access point 8 is connected to the line transmission path 6, in addition to the server 1 and the clients 2 and 3. A station 9, which is capable of accessing the access point 8 and carrying out wireless communication, is connected to the line transmission path 7, in addition to the clients 4 and 5.

The access point 8 includes a network interface unit similar to the network interface unit 17 included in the server 1 shown in FIG. 1. The station 9 has the same configuration as the network interface unit 47 included in the client 4 shown in FIG. 1.

According to such structure, when video content delivery is carried out by multicast transmission from the server 1 to the clients 4 and 5, the access point 8, which relays the packets of the video content, adds second FECs to the packets, carries, the station 9 carries out error correction on the basis of the second FECs. In this way, the packets can be transferred to the clients 4 and 5. Furthermore, between the access point 8 and the station 9, error detection codes can be added during unicast transmission, error detection can be carried out on the basis of the error detection codes, and retransmission requests can be sent.

When the line transmission path 6 and the line transmission path 7 are connected by a power line, the present invention include the access point 8 as an adapter for wire-to-power-line conversion and the station 9 as n adapter for power-line-to-wire conversion.

The server 1 may be provided as a delivery server for, for example, CDN (content distribution network or content delivery network), instead of a home server. In addition to personal computers (PC) and television sets, various electronic devices, such as digital video recorders (DVR), game machines, and mobile phones, may be employed as the server 1 and the clients.

All devices employed as the server, the clients, the access point, and the station may have the same structure, and each of the devices may function as any one of the clients, the access point, and the station. In other words, all of the devices may function as both the network interface unit 17 of the server 1 and the network interface unit 47 of the client 4 and may be capable of error correction on the basis of determination result of whether the transmission method is multicast transmission or unicast transmission.

It should be understood by those skilled in the art that various modifications, combinations, sub-combinations and alterations may occur depending on design requirements and other factors insofar as they are within the scope of the appended claims or the equivalents thereof.

What is claimed is:

1. A transmitting device that transmits a packet to at least one receiving device via a network, the transmitting device comprising:

determining means for determining whether the transmission method of transmitting the packet is multicast transmission or unicast transmission;

code-adding means for adding to the packet an error correction code for correcting an error that occurs in the packet during transmission by the receiving device when the transmission method of the packets is determined to be multicast transmission and adding to the packet an error detection code for detecting the error by the receiving device and transmitting a retransmission request signal of the packet to the transmitting device when the transmission method of the packets is determined to be unicast transmission; and transmitting means for transmitting the packet to which the error correction code or the error detection code is added to the receiving device.

2. The transmitting device according to claim 1, wherein the packet includes a header section and a data section including the error correction code, and wherein, when the determining means determines that the transmission method is multicast transmission, the transmitting means includes modulating means for modulating the data section of the packet according to a first modulation method having a first error rate and modulating the header section according to a second modulation method having a second error rate that is lower than the first error rate.

3. The transmitting device according to claim 2, further comprising:

recording means for recording error information indicating whether or not an error has occurred in the packet transmitted from the transmitting means to the receiving device when the determining means determines that the transmission method is unicast transmission, wherein the error correction code is added such that error correction is carried out at the receiving device at a first cycle, and wherein the modulating means includes comparing means for calculating a second cycle of the occurred errors on the basis of the recorded error information and comparing the first cycle and the second cycle, and transmission-speed controlling means for reducing the transmission speed of the packet in the second modulation method when the second cycle is shorter than the first cycle.

4. The transmitting device according to claim 3, wherein the transmission-speed controlling means increases the transmission speed in the second modulation method when an error has not occurred.

5. The transmitting device according to claim 4, wherein the transmission-speed controlling means is capable of increasing the transmission speed in the second modulation method to a first speed, and the code-adding means includes controlling means for not adding the error correction code to the packet during multicast transmission when an error has not occurred and when the transmission speed is the first speed.

6. The transmitting device according to claim 3, wherein the transmitting means includes a test-packet transmitting means for transmitting a test packet to the receiving device by unicast transmission when the determining means determines that the transmission method is multicast transmission so as to record the error information to the recording means before transmitting the packet by multicast transmission.

7. A receiving device that receives a packet from a transmitting device via a network, the receiving device comprising:

receiving means for receiving, from the transmitting device, the packet to which an error correction code for correcting an error that has occurred in the packet during reception or an error detection code for detecting the error and transmitting a retransmission request signal for the packet to the transmitting device;

determining means for determining whether the transmission method of the transmitting device that transmitted the received packet is multicast transmission or unicast transmission;

error-correcting means for correcting the error on the basis of the error correction code when the transmission method is determined to be multicast transmission and when the error has occurred; and error-detecting means for detecting the error on the basis of the error detection code and generating the retransmission request signal when the transmission method is determined to be unicast transmission and when the error has occurred.

8. A packet transmission method of transmitting a packet from a transmitting device to at least one receiving device via a network, the method comprising the steps of:

determining whether the transmission method of transmitting the packet is multicast transmission or unicast transmission;

adding to the packet an error correction code for correcting an error that occurs in the packet during transmission by the receiving device when the transmission method of the packets is determined to be multicast transmission and adding to the packet an error detection code for detecting the error by the receiving device and transmitting a retransmission request signal of the packet to the transmitting device when the transmission method of the packets is determined to be unicast transmission; and transmitting the packet to which the error correction code or the error detection code is added to the receiving device.

9. A packet reception method of receiving a packet at a receiving device from a transmitting device via a network, the packet reception method comprising the steps of:

receiving, from the transmitting device, the packet to which an error correction code for correcting an error that has occurred in the packet during reception or an error detection code for detecting the error and transmitting a retransmission request signal for the packet to the transmitting device;

determining whether the transmission method of the transmitting device that transmitted the received packet is multicast transmission or unicast transmission;

correcting the error on the basis of the error correction code when the transmission method is determined to be multicast transmission and when the error has occurred; and detecting the error on the basis of the error detection code and generating the retransmission request signal when the transmission method is determined to be unicast transmission and when the error has occurred.

10. A program executed by a transmitting device that transmits a packet to at least one receiving device via a network, the program comprising the steps of:
  determining whether the transmission method of transmitting the packet is multicast transmission or unicast transmission;
  adding to the packet an error correction code for correcting an error that occurs in the packet during transmission by the receiving device when the transmission method of the packets is determined to be multicast transmission and adding to the packet an error detection code for detecting the error by the receiving device and transmitting a retransmission request signal of the packet to the transmitting device when the transmission method of the packets is determined to be unicast transmission; and
  transmitting the packet to which the error correction code or the error detection code is added to the receiving device.

11. A program executed by a receiving device that receives a packet from a transmitting device via a network, the program comprising the steps of:
  receiving, from the transmitting device, the packet to which an error correction code for correcting an error that has occurred in the packet during reception or an error detection code for detecting the error and transmitting a retransmission request signal for the packet to the transmitting device;
  determining whether the transmission method of the transmitting device that transmitted the received packet is multicast transmission or unicast transmission;
  correcting the error on the basis of the error correction code when the transmission method is determined to be multicast transmission and when the error has occurred; and
  detecting the error on the basis of the error detection code and generating the retransmission request signal when the transmission method is determined to be unicast transmission and when the error has occurred.

12. A transmitting device that transmits a packet to at least one receiving device via a network, the transmitting device comprising:
  a determining unit configured to determine whether the transmission method of transmitting the packet is multicast transmission or unicast transmission;
  a code-adding unit configured to add to the packet an error correction code for correcting an error that occurs in the packet during transmission by the receiving device when the transmission method of the packets is determined to be multicast transmission and add to the packet an error detection code for detecting the error by the receiving device and transmitting a retransmission request signal of the packet to the transmitting device when the transmission method of the packets is determined to be unicast transmission; and
  a transmitting unit configured to transmit the packet to which the error correction code or the error detection code is added to the receiving device.

13. A receiving device that receives a packet from a transmitting device via a network, the receiving device comprising:
  a receiving unit configured to receive, from the transmitting device, the packet to which an error correction code for correcting an error that has occurred in the packet during reception or an error detection code for detecting the error and transmitting a retransmission request signal for the packet to the transmitting device;
  a determining unit configured to determine whether the transmission method of the transmitting device that transmitted the received packet is multicast transmission or unicast transmission;
  an error-correcting unit configured to correct the error on the basis of the error correction code when the transmission method is determined to be multicast transmission and when the error has occurred; and
  an error-detecting unit configured to detect the error on the basis of the error detection code and generate the retransmission request signal when the transmission method is determined to be unicast transmission and when the error has occurred.

* * * * *